3,597,385
PROCESS FOR THE MANUFACTURE OF SELF-EXTINGUISHING, NON-GLOWING, FILLER-CONTAINING RUBBER BLENDS

Klaus Komorniczyk, Turnich-Balkhausen, Franz-Josef Dany, Hurth, near Cologne, and Joachim Kandler and Hans-Peter Beu, Lechenich, Germany, assignors to Knapsack Aktiengesellschaft, Knapsack, near Cologne, Germany
No Drawing. Filed Nov. 26, 1969, Ser. No. 880,437
Claims priority, application Germany, Dec. 4, 1968,
P 18 12 521.8
Int. Cl. C08c *11/24;* C08f *45/30*
U.S. Cl. 260—33.8                                                 8 Claims

ABSTRACT OF THE DISCLOSURE

Production of self-extinguishing, non-glowing, filler-containing rubber blends which are capable of being vulcanized, by incorporating a flameproofing agent into the filler-containing rubber blend. The flameproofing agent is a ternary mixture consisting of pulverulent red phosphorus, ammonium bromide and a chlorinated paraffin.

---

The present invention relates to a process for the manufacture of self-extinguishing, non-glowing, filler-containing rubber blends, wherein the filler is preferably carbon black and which are capable of being vulcanized, by incorporation of a ternary component mixture as a flameproofing agent into the rubber blends.

After the inflammation of vulcanized rubber having a carbon black filler therein, glow nests are found to commence forming once the flame has ceased to burn, which subsist for some time and effect re-inflammation of the rubber, upon the access of air. These glow nests which are often enveloped by a strong heat-retaining carbon layer, tenaciously withstand normal fire-fighting efforts as their stability is even favored by the said heat-retaining layer.

It has already been suggested that vulcanizable natural or synthetic rubber blends having a carbon black filler therein be rendered flameproof by the incorporation of chlorinated hydrocarbons or further materials useful to this effect. These further materials include those, which following the inflammation of rubber, evolve incombustible gases or melt with the resultant formation of a protective coat that envelops the rubber particles and enables ignition and combustion thereof to be avoided. In "Grundlagen der Wissenschaft und Technologie des Kautschuks," published by Verlag Berliner Union GmbH., Stuttgart, 1956, page 167, LeBras has suggested that magnesium carbonate or zinc carbonate as well as calcium borate or zinc borate be suitably used to this effect. While these materials have enabled the inflammability of vulcanized rubber to be reduced, the fact remains that they have failed to free extinguished rubber from its after-glow tendency. Merely ammonium halides, more particularly ammonium bromide, could be found to reduce the inflammability of vulcanizable carbon black-containing rubber blends and to simultaneously avoid the after-glow effect described hereinabove. Ammonium halides are, however, known to be readily water-soluble compounds and their use as a flameproofing agent in vulcanized rubber has failed to be fully satisfactory. The reason for this is that they become increasingly extracted in the course of time, under the action of water, and then naturally fail to be fully effective. This handicaps the use of ammonium halides as flameproofing agents for vulcanized rubber. The $NH_4$-halides further effect, and this should be added, the occurrence of efflorescence phenomena comprising grey-white spots and points on the surface of vulcanized material. As time goes on, these spots and points become increasingly more distinct, especially in moist air. This is an disadvantageous effect seen under optical aspects, and normally believed to impair the material's quality.

Apart from the above flameproofing agents, it has been suggested in German Pat. 1,173,641 that flameproofing properties be imparted to foamed polyurethanes by incorporating thereinto one or more halogenated compounds or derivatives of phosphorous or phosphoric acid, one or more compounds of antimony or pulverulent red phosphorus. Experiments have shown, however that the flameproofing agents incorporated into foamed polyurethane are unsuitable for incorporation into filler-containing rubber blends, such as those treated by the process of the present invention. The reason for this is that they have failed to avoid undesirable after-glow effects.

It has now unexpectedly been found that vulcanizable, rubber blends with a filler therein can be rendered flameproof, using a mixture comprising three conventional flameproofing agents. The rubber blends so treated were exposed to inflammation and thereafter found to combine self-extinguishing properties with freedom from after-glow effects.

The process of the present invention for the manufacture of self-extinguishing, non-glowing, filler-containing rubber blends, wherein the filler is preferably carbon black and which are capable of being vulcanized, by the incorporation of flameproofing agents into the filler-containing rubber blend comprises more particularly incorporating as the flameproofing agent a ternary mixture consisting of pulverulent red phosphorus, ammonium bromide and a chlorinated paraffin, the individual components forming the ternary mixture being used in a quantitative proportion of at least about 5 weight percent, and the ternary mixture itself being used in a quantitative proportion of about 10 to 100 grams, per 100 grams rubber.

The pulverulent red phosphorus component and the ammonium bromide component should preferably be used in the form of particles with a maximum size of about $40\mu$ so as to ensure homogeneous and fine distribution of the two components in the rubber blend.

A further preferred feature of the present process comprises using a liquid chlorinated paraffin as one of the components forming the ternary mixture. The chlorinated paraffin should preferably contain between about 20 and 80 weight percent chlorine. This makes it possible for the liquid chlorinated paraffin to be first made together with the pulverulent red phosphorus and the ammonium bromide components into a paste, which can safely be incorporated into the rubber blend to be vulcanized, using a roll or internal kneader. The components forming the flameproofing agent, more particularly red phosphorus, should preferably not be incorporated individually into the rubber, as red phosphorus tends to initiate dust explosions. The advantage which accompanies the use of a liquid chlorinated paraffin resides in that the combination of the water-insoluble paraffin with the further components effects formation of a protective coat, which envelops the ammonium bromide particles and effectively prevents water from dissolving and extracting them from the rubber blends or vulcanized rubber.

Chlorinated paraffins containing between about 56 and 64 weight percent, for example, have been found to be particularly useful in the process of the present invention.

Optimum flameproofing effects are produced in those cases in which the individual components forming the ternary mixture are used in a ratio by weight of substantially 1:1:1. Needless to say the components may also be used in a ratio by weight other than that indicated above with the understanding, however, that each of the individual components forming the ternary mixture be used in a quantitative proportion of at least about 5 weight percent.

The ternary mixture added to the rubber blend should preferably be used at a rate of 30 to 70 grams, per 100 grams rubber.

The process of the present invention can be used for flameproofing natural as well as synthetic rubber having the addends usually necessary for vulcanization incorporated therein, for example softeners, antiagers, vulcanization accelerators, fillers and similar materials. The fillers include, for example, carbon black or silicic acids.

The fact that the present process enables filler-containing, vulcanized rubber to be completely freed from after glow-effects, following self-extinction, must be regarded as an unexpected result, bearing in mind that merely a mixture of red phosphorus, ammonium bromide and a chlorinated paraffin could be found to confer satisfactory self-extinguishing properties and absence of after-glow effects upon the rubber. In those cases in which the components forming the ternary mixture were used individually, it has been impossible to produce similar results.

The use of the suggested combination of conventional flameproofing agents is a very desirable step forward in the art as shown in the following example read in context with the test results in the table hereinafter.

EXAMPLE

A series of altogether 7 comparative tests was carried out to determine the extinction time, the burn-up length and the after-glow tendency of test specimens 70 mm. long of vulcanized natural rubber, which was ignited. The test specimens used in tests Nos. 2 to 7 all contained the same proportion of flameproofing agent. The test specimen used in test No. 1 was free from flameproofing agent, and the test specimen used in test No. 7 contained the combination of flameproofing agents suggested to be used in accordance with the present invention.

The rubber blend used for vulcanization was composed of:

| | Parts by wt. |
|---|---|
| Natural rubber, smoked sheets (NK) | 100 |
| Stearic acid | 3 |
| Phenyl - β - naphthylamine | 2 |
| Acetogen (R)-carbon black | 50 |
| Flameproofing agent | 50 |
| Zinc oxide, active | 3.5 |
| Sulfur | 2.5 |
| Benzothiazyl - N - cyclohexylsulfenamide | 1 |

The individual addends were incorporated into unvulcanized natural rubber in the above sequential order at 90° C., with the use of a roll kneader. The flameproofing agent and the carbon black were jointly incorporated into the natural rubber. Red phosphorus or ammonium bromide as the flameproofing agent were used in the form of particles with a maximum size of $35\mu$. The chlorinated paraffin was liquid and contained 64 weight percent chlorine. The rubber blend was vulcanized at 140° C. under a molding pressure of 265 kg./cm.$^2$, within 25 minutes.

The incendiary behaviour of the various vulcanized test specimens was determined by the ASTM D635–44 T-method. Following the self-extinction of the test specimens with the flameproofing agent therein, the after-glow tendency was evaluated. To this effect, attempts were made to re-inflame the glowing test specimens by the admission of compressed air. The evaluation of the after-glow tendency was based on the following evaluation scale.

(a) Strong after-glow:
Specimen was re-inflamed, or glow was found to persist and spread out
(b) Slight after-glow:
Relatively small glow nests, which immediately extinguished upon the admission of air
(c) Absence of after-glow:
No glow nests; combustion occurred without glow.

The test results obtained on burning the 7 test specimens are indicated in the following table.

| Test Number: | Flameproofing agent | Quantity of flameproofing agent in grams per 100 grams rubber | Extinction period (seconds) | Burn-up length in mm. for a total burn-up length of 70 mm. | After-glow tendency |
|---|---|---|---|---|---|
| 1 | | | 82 | Complete combustion | |
| 2 | Red phosphorus | 50 | 31 | do | |
| 3 | NH$_4$Br | 50 | <1 | <5 | c |
| 4 | Chlorinated paraffin | 50 | 114 | Complete combustion | |
| 5 | Red phosphorus plus chlorinated paraffin (1:1) | 50 | 46 | 20 | a |
| 6 | Red phosphorus plus NH$_4$Br (1:1) | 50 | 3 | <5 | b |
| 7 | Red phosphorus plus NH$_4$Br plus chlorinated paraffin (1:1:1) | 50 | <1 | <5 | c |

We claim:

1. In the process for the manufacture of self-extinguishing, non-glowing, filler-containing rubber blends, which are capable of being vulcanized, by incorporating a flameproofing agent into the filler-containing rubber blend, the improvement which comprises incorporating as the flameproofing agent a ternary mixture consisting of pulverulent red phosphorus, ammonium bromide and a chlorinated paraffin, the individual components forming the ternary mixture being used in a quantitative proportion of at least about 5 weight percent, and the ternary mixture itself being used in a quantitative proportion of between about 10 and 100 grams, per 100 grams rubber.

2. The process as claimed in claim 1, wherein the filler is carbon black.

3. The process as claimed in claim 1, wherein the pulverulent red phosphorus and the ammonium bromide have a particle size of at most about $40\mu$.

4. The process as claimed in claim 1, wherein a liquid chlorinated paraffin is used as one of the components forming the ternary mixture of flameproofing agents.

5. The process as claimed in claim 1, wherein the chlorinated paraffin contains between about 20 and 80 weight percent chlorine.

6. The process as claimed in claim 1, wherein the liquid chlorinated paraffin contains between about 56 and 64 weight percent chlorine.

7. The process as claimed in claim 1, wherein the individual components forming the ternary mixture are used in a ratio by weight of substantially 1:1:1.

8. The process as claimed in claim 1, wherein the ternary mixture is used at the rate of between about 30 and 70 grams, per 100 grams rubber.

References Cited

UNITED STATES PATENTS

| | | | |
|---|---|---|---|
| 2,545,977 | 3/1951 | Smith | 260—28.5 |
| 3,239,482 | 3/1966 | Rapp | 260—41 |

FOREIGN PATENTS 1,173,641  1/1965  Germany.

MORRIS LIEBMAN, Primary Examiner

J. H. DERRINGTON, Assistant Examiner

U.S. Cl. X.R.

106—15FP; 260—41, 41.5, 45.7P, 45.9R, 763